United States Patent Office 2,694,704
Patented Nov. 16, 1954

2,694,704

SALTS OF TERTIARY AND QUATERNARY BICYCLIC ETHYLENE IMINE BASES AND PROCESS

Ernst Wilhelm Gassenmeier, deceased, late of Mannheim, Germany, by Ruth Martha Gassenmeier, heir and guardian of minor heirs, Mannheim, Germany, and Curt Schuster, Ludwigshafen (Rhine), Germany, assignors to Badische Anilin- & Soda-Fabrik Aktiengesellschaft, Ludwigshafen (Rhine), Germany No Drawing. Application May 23, 1952,
Serial No. 289,682

Claims priority, application Germany May 25, 1951

9 Claims. (Cl. 260—239)

This invention relates to a process for the production of salts of tertiary and quaternary bicyclic ethylene imine bases, especially of tertiary and quaternary spiro-cyclohexyl-ethylene imine bases.

By this reaction of alkyl halides or sulfates with ethylene imine and most of its derivatives there occurs, under the usual conditions, addition with opening of the ethylene imine ring and the addition products readily tend to polymerize. Only by working in the presence of acid-binding agents it is possible to prepare N-alkylethylene imines; ordinary or quaternary ammonium salts of such bases have not been obtainable hitherto.

We have now found that salts of tertiary ethylene imine derivatives of the general formula III (below) are obtained by causing agents of the general formula II to act on spirocyclohexylethylene imine (Formula I) or its derivatives:

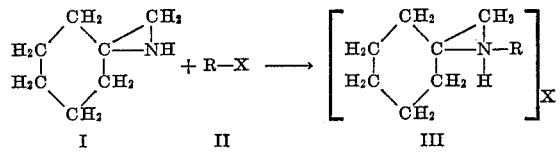

In these formulae, R is an alkyl, cycloalkyl or aralkyl group, which may also contain substituents, such as halogen, hydroxyl, carbonyl, nitro, carboxylic acid ester or sulfonic acid groups, while X is chlorine, bromine or iodine or the radical of sulfuric acid or of an aliphatic, aromatic or cycloaliphatic sulfonic acid. Instead of monofunctional compounds R—X, there may be used bifunctional compounds, as for example 1.6-dichlorhexane or para-xylylene dichloride, and one molecule of these bifunctional compounds may be reacted with one or two molecules of the spirocyclohexylethylene imine (I).

The reaction is preferably carried out in an indifferent diluent, such as benzene, toluene, chloroform or carbon tetrachloride, while heating. In some cases an excess of the component II may serve as the diluent.

The salts of the type III remaining after removal of the diluent are usually crystalline watersoluble products. By adding alkali solutions to their aqueous solutions, the free tertiary bases are obtained htererfrom and these, like other tertiary bases, may be converted by treatment with compounds R′—X of type II into quaternary ammonium salts of the type IV:

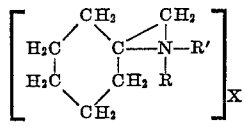

R and R′ may be identic or different, but R′ and X have the same significance as given above for R and X.

The salts of tertiary and quaternary ethylene imine bases which are readily accessible in the said manner are valuable textile assistants and are also capable of being employed for pharmaceutical purposes.

The following examples will further illustrate this invention but the invention is not restricted to these examples. The parts are by weight.

Example 1

222 parts of spirocyclohexylethylene imine and 258 parts of ethyl chloride are heated on a waterbath to boiling for 4 hours under an efficient reflux condenser. When the reaction mixture which has become viscous and yellowish is allowed to cool, about 250 parts of colourless N-ethylspirocyclohexylethylene imine hydrochloride crystallize out.

The base set free from the aqueous solution of the said compound by means of alkali solution is a colourless oil which is sparingly soluble in water and which boils at 80° to 82° C. at 38 torr.

Similar compounds are obtained if, instead of ethyl chloride, there are used n-propyl bromide, iso-butyl-iodide, cyclopentyl bromide, dimethyl sulfate or p-toluene sulfonic acid ethyl ester.

By boiling 32 parts of N-ethylspirocyclohexylethylene imine and 26.5 parts of benzyl chloride for 2 hours under reflux, there crystallize on cooling 40 to 45 parts of N-ethyl-N-benzylspirocyclohexylethylene imonium chloride having a melting point of 172° C. This quaternary salt is readily soluble in water. The aqueous solution has a strong bactericidal action.

Similar compounds are obtained if, instead of benzyl chloride, hexane or cyclohexane sulfonic acid benzyl esters are used.

Example 2

160 parts of spirocyclohexylethylene imine are boiled with 365 parts of benzyl chloride for 2 hours under reflux, allowed to cool and the precipitated crystal pulp filtered off by suction after several hours. After washing out with carbon tetrachloride and drying, the yield of N-benzyl-spirocyclohexylethylene imine hydrochloride is 240 parts. The salt melts at 209° C. and is readily soluble in water.

By adding caustic soda solution to its aqueous solution, the free N-benzyl-spirocyclohexylethylene imine is obtained as an oil having a boiling point of 155° to 160° C. at 2 torr; it is sparingly soluble in water.

By heating 100 parts of this base with 125 parts of dodecyl bromide for 3 hours at 80° C. under reflux, about 180 parts of N-benzyl-N-dodecylspirocyclohexylethylene imonium bromide are obtained as a colourless crystalline mass having a melting point of 228° C. which is readily soluble in water forming strongly foaming solutions.

Similar compounds are obtained if, instead of benzyl-chloride, p-bromo- or m-nitro benzyl bromide and, instead of dodecyl bromide, omega bromo capronic acid methyl ester are used.

Example 3

111 parts of spirocyclohexylethylene imine and 52 parts of ethylene chloride are boiled for an hour under reflux. The mixture is allowed to cool and the deposited crystal mass is filtered off by suction and washed out with carbon tetrachloride. 120 parts of N.N′-ethylene-bis-spirocyclohexylethylene imine dihydrochloride having a melting point of 212° C. are obtained.

By dissolving the salt in water and adding caustic soda solution, 80 parts of the free base are obtained as a colourless liquid having a boiling point of 176° to 180° C. at 1.5 torr.

By heating a solution of 50 parts of this base in 50 parts of benzene with 50 parts of benzyl chloride to boiling for 2 hours under reflux, there are obtained, after working up, 70 parts of ethylene-bis-[N.N′-benzyl-spirocyclohexylethylene imonium chloride] as a white crystalline mass which melts above 260° C. with decomposition. The salt is readily soluble in water and has remarkable bactericidal properties.

Similar compounds are obtained if, instead of ethylene chloride, there are used 1.4-dibromo butane, 1.6-dibromo-hexane or p-xylylene dichloride.

What we claim is:
1. A process for the production of N-ethyl-N-benzyl-spiro-cyclohexylethylene imonium chloride which comprises boiling spirocyclohexylethylene imine with ethyl chloride, setting free the N-ethyl-spirocyclohexylethylene imine by means of alkali from the tertiary salt obtained and boiling it with benzyl chloride.

2. A process for the production of N-benzyl-N-dodecyl-spirocyclohexyl imonium bromide which comprises boiling spiro-cyclohexylethylene imine with benzyl chloride, setting free the N-benzyl spirocyclohexylethylene imine by means of alkali from the tertiary salt obtained and heating it to about 80° C. with dodecyl bromide.

3. A process for the production of alkylene-bis-[N.N'-benzyl-spirocyclohexylethylene imonium chloride] which comprises boiling spirocyclohexylethylene imine with a dihalogeno alkane, setting free the bis-tertiary base by means of alkali from the bis-tertiary imonium salt obtained, and boiling it with benzylchloride.

4. A process for the production of ethylene-bis-[N.N'-benzyl spirocyclohexylethylene imonium chloride] which comprises boiling spirocyclohexylethylene imine with ethylene chloride, setting free the N.N'-ethylene-bis-[spirocyclohexylethylene imine] by means of alkali from the bis-tertiary imonium salt obtained, and boiling it with benzyl chloride.

5. A process for the production of spirocyclohexyl ethylene imonium salts which comprises heating spirocyclohexyl ethylene imine with at least equivalent amounts of a member of the group consisting of monovalent alkyl halides up to dodecyl halides and benzyl halides, and divalent lower alkylene and p-xylylene halides, setting free the tertiary spirocyclohexyl ethylene imines formed by means of alkali and heating them with another at least equivalent amount of a halide of said group.

6. Spirocyclohexylethylene imonium salts of the general formula

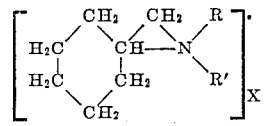

in which R represents a member of the group consisting of monovalent alkyl up to dodecyl and benzyl groups and divalent lower alkylene and p-xylene groups, R' represents a member of the group consisting of hydrogen, and monovalent alkyl up to dodecyl groups and $x$ represents a halogen anion.

7. N-ethyl-N-benzylspirocyclohexylethylene imonium chloride.

8. N-benzyl-N-dodecyl-spirocyclohexylethylene imonium bromide.

9. Ethylene - bis [N.N'-benzylspirocyclohexylethylene imonium chloride].

References Cited in the file of this patent

FOREIGN PATENTS

| Number | Country | Date |
|--------|---------|------|
| 270,826 | Switzerland | Jan. 3, 1951 |
| 805,905 | France | Sept. 7, 1936 |